(12) United States Patent
Lee et al.

(10) Patent No.: US 10,673,597 B2
(45) Date of Patent: *Jun. 2, 2020

(54) DEVICE TO DEVICE (D2D) OPERATING METHOD OF UE IN WIRELESS COMMUNICATION SYSTEM AND UE USING METHOD

(71) Applicant: LG Electronics Inc., Seoul (KR)

(72) Inventors: Seungmin Lee, Seoul (KR); Hyunho Lee, Seoul (KR); Kyuhwan Kwak, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/525,774

(22) Filed: Jul. 30, 2019

(65) Prior Publication Data
US 2019/0356457 A1    Nov. 21, 2019

Related U.S. Application Data

(63) Continuation of application No. 16/146,793, filed on Sep. 28, 2018, now Pat. No. 10,389,505, which is a
(Continued)

(51) Int. Cl.
*H04L 5/00* (2006.01)
*H04W 72/04* (2009.01)
(Continued)

(52) U.S. Cl.
CPC ........... *H04L 5/0057* (2013.01); *H04W 24/10* (2013.01); *H04W 72/02* (2013.01); *H04W 72/04* (2013.01); *H04W 72/042* (2013.01); *H04W 92/18* (2013.01)

(58) Field of Classification Search
CPC .. H04L 5/0057; H04W 72/042; H04W 24/10; H04W 92/18
See application file for complete search history.

(56) References Cited

U.S. PATENT DOCUMENTS

| | | |
|---|---|---|
| 9,571,247 B2 | 2/2017 | Xiong et al. |
| 9,603,040 B2 | 3/2017 | Chandrasekhar et al. |

(Continued)

FOREIGN PATENT DOCUMENTS

KR    1020090031410    3/2009

OTHER PUBLICATIONS

Motorola Mobility, et al., "CSI Aspects of Shortened TTI," 3GPP TSG RAN WG1#88bis, Apr. 3-7, 2017, 4 pages.
(Continued)

*Primary Examiner* — Mohammad S Anwar
(74) *Attorney, Agent, or Firm* — Fish & Richardson P.C.

(57) ABSTRACT

The present invention provides a method of transmitting a channel quality indicator (CQI) in a wireless communication system. The method performed by a user equipment supporting a relatively shorter transmission time interval (S-TTI) than a legacy transmission time interval (L-TTI) includes determining predefined control channel-related overhead depending on whether S-TTI-based communication is performed and transmitting the CQI based on the determined predefined control channel-related overhead. If the S-TTI-based communication is performed, the predefined control channel-related overhead is identically determined between an S-TTI including a legacy physical downlink control channel (PDCCH) region and a S-TTI not including a legacy PDCCH region.

15 Claims, 18 Drawing Sheets

Related U.S. Application Data continuation of application No. PCT/KR2018/005246, filed on May 8, 2018.

(60) Provisional application No. 62/581,595, filed on Nov. 3, 2017, provisional application No. 62/565,078, filed on Sep. 28, 2017, provisional application No. 62/563,636, filed on Sep. 26, 2017, provisional application No. 62/561,723, filed on Sep. 22, 2017, provisional application No. 62/505,891, filed on May 13, 2017, provisional application No. 62/502,610, filed on May 6, 2017.

(51) Int. Cl.
*H04W 24/10* (2009.01)
*H04W 72/02* (2009.01)
*H04W 92/18* (2009.01)

(56) References Cited

U.S. PATENT DOCUMENTS

| | | |
|---|---|---|
| 10,389,505 B2 * | 8/2019 | Lee ............... H04L 5/0057 |
| 2014/0204869 A1 | 7/2014 | Lin |
| 2017/0280429 A1 | 9/2017 | Shen |

OTHER PUBLICATIONS

Huawai et al. "Discussion on CSI Feedback for Short TTI," 3GPP TSG RAN WG1#88bil, Apr. 3-7, 2017, 5 pages.
ITRI, "Discussion on CSI Reporting for sTTI Operation," 3GPP TSG RAN WG1#88bis, Apr. 3-7, 2017, 4 pages.
Qualcomm Incorporated, "sPDCCH Design for Shortened TTI," R1-1704987, 3GPP TSG RAN WG1 #88b, Spokane, USA, dated Apr. 3-7, 2017, 11 pages.

* cited by examiner

FIG. 7
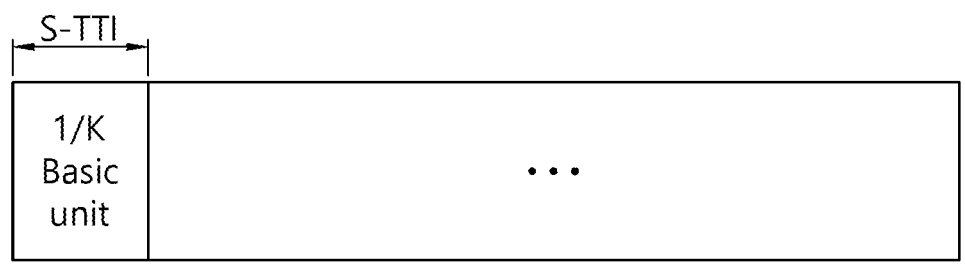
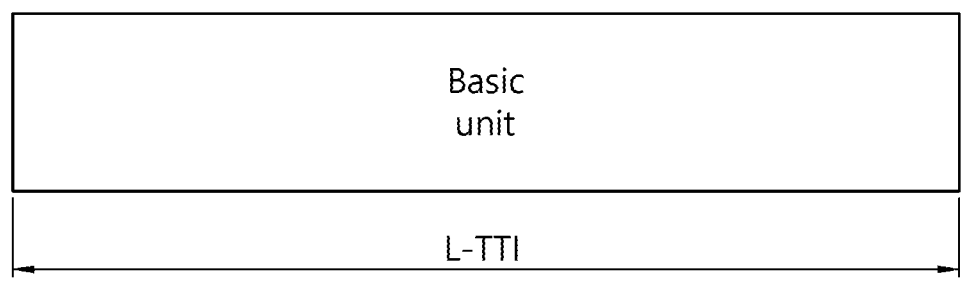

FIG. 14
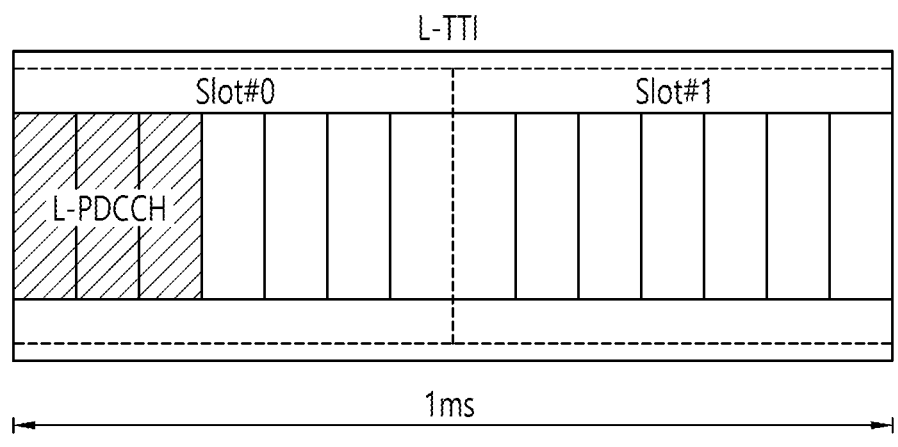
(a)
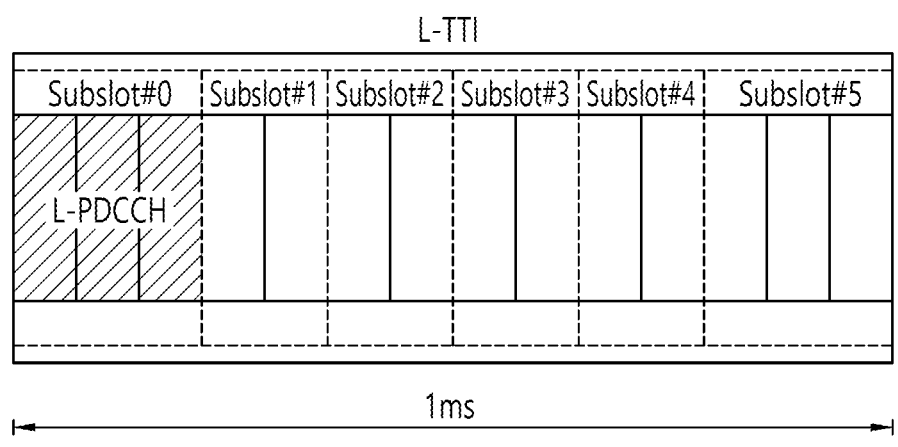
(b)

DEVICE TO DEVICE (D2D) OPERATING METHOD OF UE IN WIRELESS COMMUNICATION SYSTEM AND UE USING METHOD

CROSS-REFERENCE TO RELATED APPLICATIONS

This application is a continuation of U.S. patent application Ser. No. 16/146,793 filed on Sep. 28, 2018, which claims benefit of International Application PCT/KR2018/005246, with an international filing date of May 8, 2018, which claims the benefit of U.S. Provisional Patent Applications No. 62/502,610 filed on May 6, 2017, No. 62/505,891 filed on May 13, 2017, No. 62/561,723 filed on Sep. 22, 2017, No. 62/563,636 filed on Sep. 26, 2017, No. 62/565,078 filed on Sep. 28, 2017 and No. 62/581,595 filed on Nov. 3, 2017, the contents of which are hereby incorporated by reference herein in its entirety.

BACKGROUND OF THE INVENTION

Field of the Invention

The present invention relates to wireless communication and, more particularly, to a D2D operating method of a UE in a wireless communication system and a UE using the method.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Recently, there has been a growing interest in D2D (Device-to-Device) technology for direct communication between devices. In particular, D2D is attracting attention as a communication technology for the public safety network. Commercial communication networks are rapidly changing to LTE, but current public safety networks are mainly based on 2G technology in terms of conflicts with existing communication standards and cost. These technological gaps and demands for improved services have led to efforts to improve public safety networks.

In the present invention, when a UE performs S-TTI-based wireless communication, which method will be provided in order to derive S-TTI-based channel state information (CSI) is discussed.

SUMMARY OF THE INVENTION

The present invention provides a D2D operating method of a UE in a wireless communication system and a UE using the method.

In an aspect, a method for transmitting a channel quality indicator (CQI) is provided. The method may be performed by a user equipment (UE), which supports a short transmission time interval (S-TTI) relatively short compared to a legacy transmission time interval (L-TTI), and comprise determining overhead related to a predefined control channel based on whether a S-TTI based communication is performed and transmitting the CQI based on the determined overhead related to the preconfigured control channel, if the S-TTI based communication is performed, the overhead related to the predefined control channel may be equally determined between an S-TTI which includes a legacy physical downlink control channel region (legacy PDCCH region) and an S-TTI which does not include the legacy PDCCH region.

The predefined control channel may be a PDCCH.

The L-TTI may comprise a plurality of S-TTIs.

The L-TTI may be 1 ms.

If the S-TTI-based communication is performed, the predefined control channel-related overhead may be identically determined between a reference resource based on an S-TTI comprising a legacy PDCCH region and a reference resource based on an S-TTI not comprising a legacy PDCCH region.

In another aspect, a method for reporting channel state information (CSI) is provided. he method may be performed by a user equipment (UE), which supports a short transmission time interval (S-TTI) relatively short compared to a legacy transmission time interval (L-TTI), and comprise receiving downlink control information (DCI) and reporting the CSI which is triggered by the DCI, the CSI may be reported based on a transmission mode for a subframe at which the DCI is received.

The CSI may be reported based on a transmission mode for a subframe to which an S-TTI in which the DCI has been received belongs.

A type of the subframe may be one of a multicast broadcast single frequency network (MBSFN) subframe type and a non-MBSFN (NMBSFN) subframe type.

If the type of the subframe is the MBSFN subframe type and the type of the subframe is the NMBSFN subframe type, different transmission modes may be configured.

In another aspect, a method for channel state information (CSI) reporting is provided. The method may be performed by a user equipment (UE), which supports a short transmission time interval (S-TTI) relatively short compared to a legacy transmission time interval (L-TTI), and comprise determining a CSI reference resource for the CSI reporting, performing the CSI reporting based on the CSI reference resource, the UE may determine the CSI reference resource in units of the S-TTI.

If the CSI reporting may be triggered on an S-TTI physical downlink control channel (PDCCH), the CSI reference resource is selected in the S-TTI unit.

If the CSI reporting is triggered by S-TTI-related CSI reporting triggering DCI, the CSI reference resource may be selected in the S-TTI unit.

If the CSI reporting is transmitted through an S-TTI physical uplink shared channel (PUSCH) or physical uplink control channel (PUCCH), the CSI reference resource may be selected in the S-TTI unit.

CSI reference resource timing related to the CSI reporting may be counted in the S-TTI unit.

In accordance with the present invention, there is provided a method of deriving S-TTI-based channel state information (CSI) when a UE performs S-TTI-based wireless communication.

BRIEF DESCRIPTION OF THE DRAWINGS

FIG. 7 schematically shows another example of an S-TTI and an L-TTI.

FIG. 14 schematically shows an example in which control channel (e.g., legacy PDCCH)-related overhead (previously configured) fixed with respect to all of S-TTIs may be assumed regardless of whether a specific S-TTI includes a legacy PDCCH region is assumed.

DESCRIPTION OF EXEMPLARY EMBODIMENTS

Hereinafter, a term or abbreviation not separately defined may be defined in 3GPP TS 36 series or TS 38 series.

Figure 1:
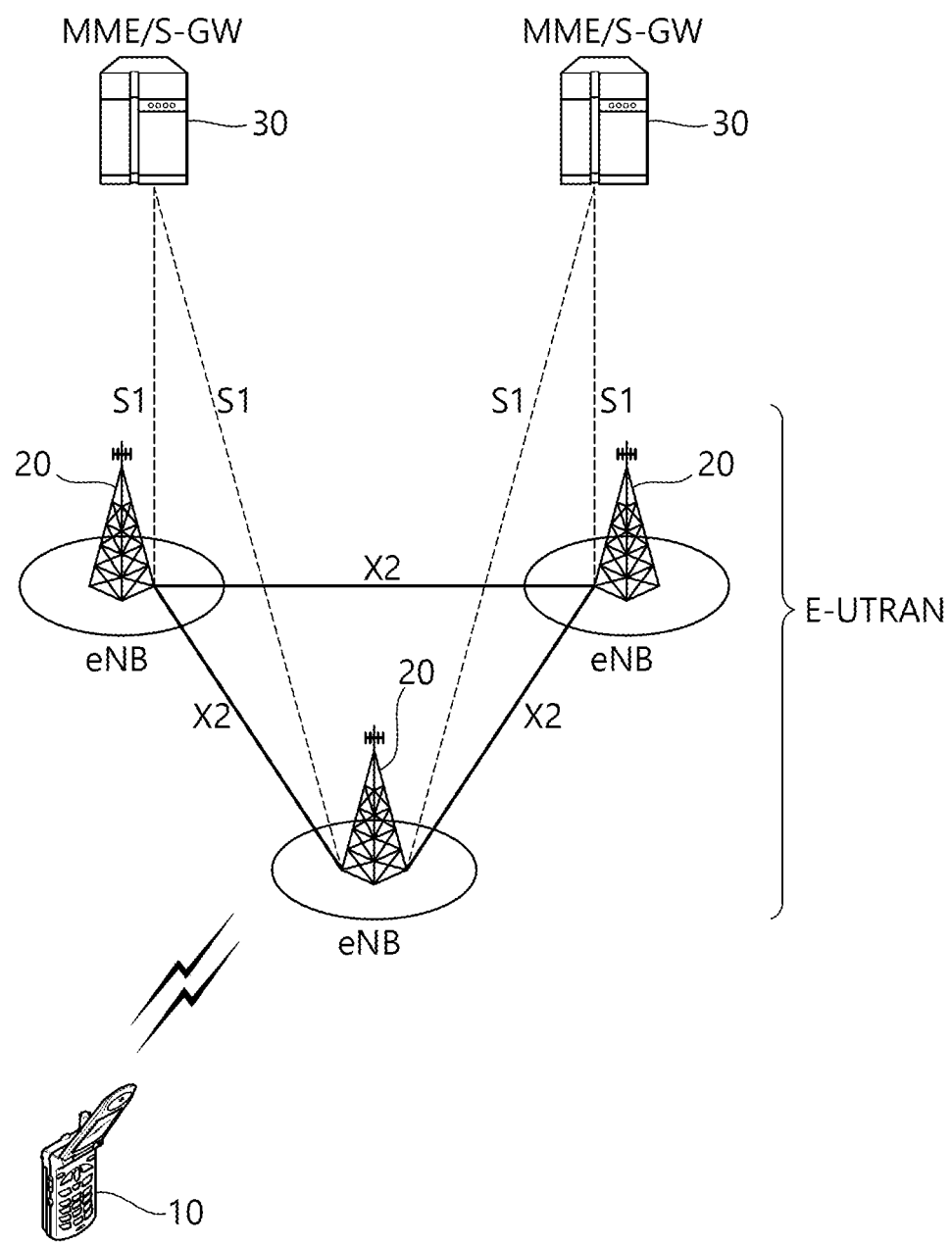
FIG. 1 illustrates a wireless communication system.

FIG. 1 illustrates a wireless communication system. The system may also be called an evolved-UMTS terrestrial radio access network (E-UTRAN) or long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
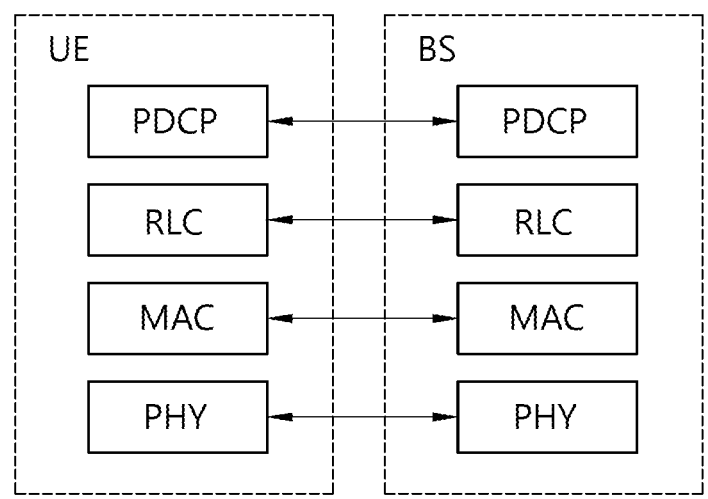
FIG. 2 is a diagram showing a wireless protocol architecture for a user plane.
Figure 3:
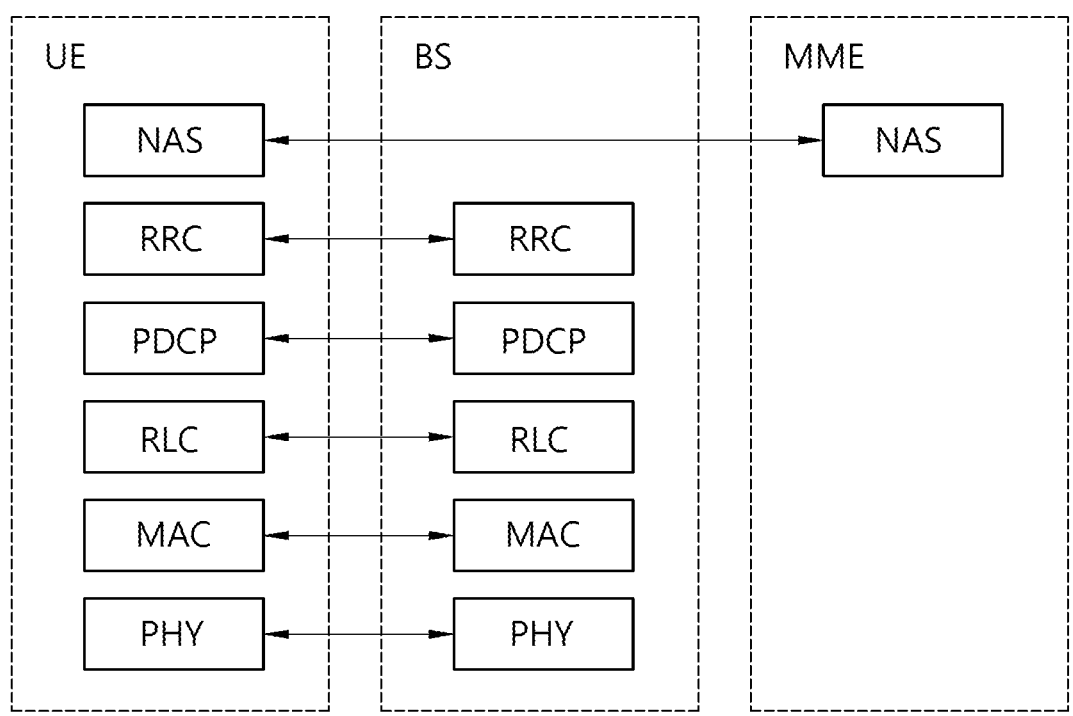
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) is described. The new radio access technology may be abbreviated as a new radio (NR).

As more communication devices require a greater communication capacity, there emerges a need for mobile broadband communication more enhanced than the existing radio access technology (RAT). Furthermore, massive machine type communications (MTC) in which multiple devices and things are connected to provide various services anywhere and at any time is also one of major issues to be taken into consideration in next-generation communication. Furthermore, a communication system design in which a service/UE sensitive to reliability and latency are taken into consideration is discussed. The introduction of a next-generation radio access technology in which enhanced mobile broadband communication, massive MTC, and ultra-reliable and low latency communication (URLLC) are taken into consideration is discussed. In the present invention, the corresponding technology is called a new RAT or NR, for convenience sake.

Figure 4:
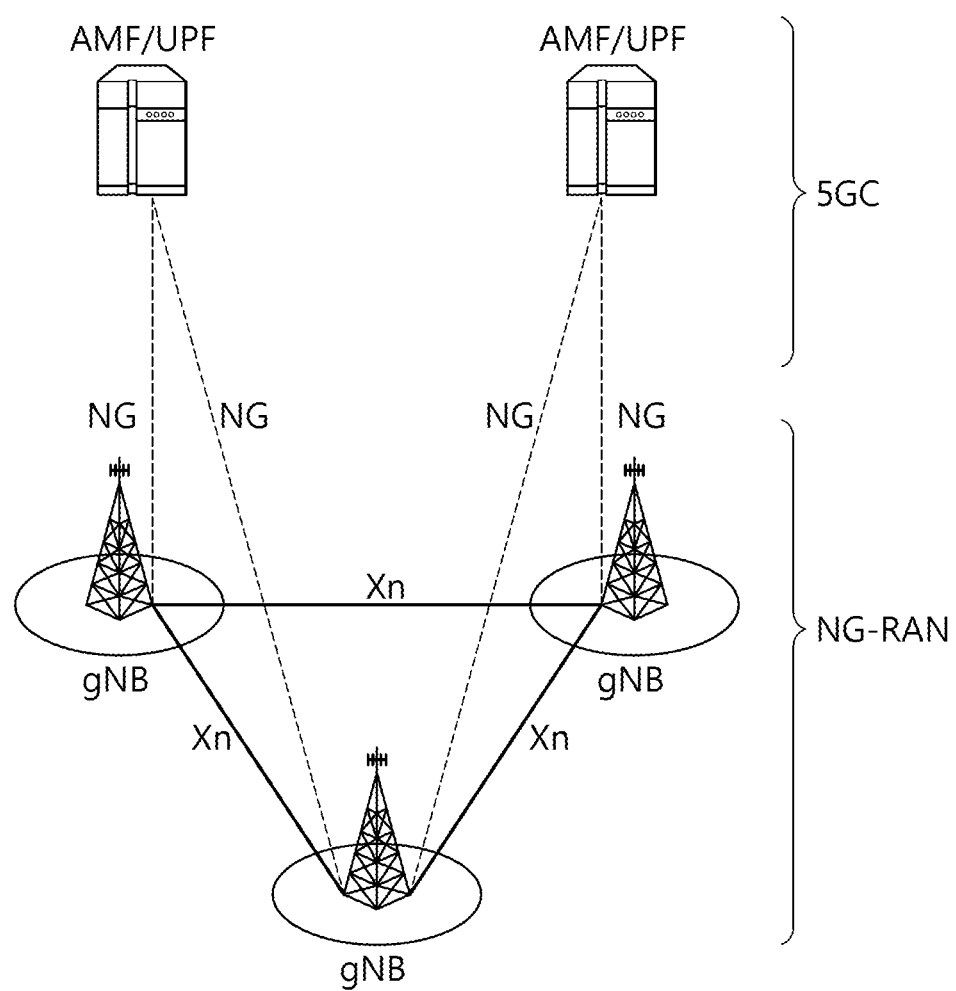
FIG. 4 illustrates system architecture of a next-generation radio access network (NG-RAN) to which NR is applied.

FIG. 4 illustrates system architecture of a next-generation radio access network (NG-RAN) to which NR is applied.

Referring to FIG. 4, the NG-RAN may include a gNB and/or a base station (BS) which provides a UE with user plane and control plane protocol termination. FIG. 4 illustrates a case where only gNBs are included. The gNBs and the eNBs are interconnected through an Xn interface. The gNB and the eNB are connected to a 5G core network (5GC) through NG interfaces. More specifically, the gNB and the eNB are connected to an access and mobility management function (AMF) through an NG-C interface and connected to a user plane function (UPF) through an NG-U interface.

Figure 5:
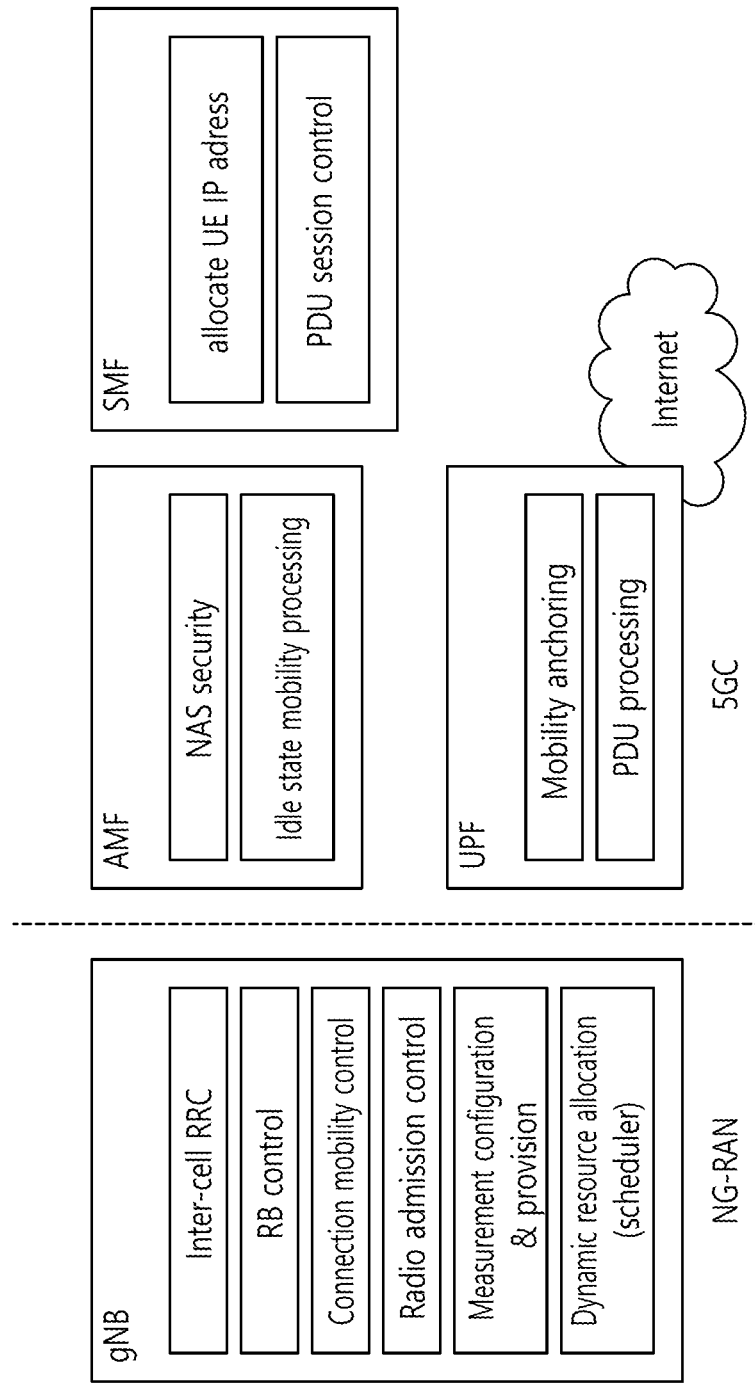
FIG. 5 illustrates function split between the NG-RAN and the 5GC.

FIG. 5 illustrates function split between the NG-RAN and the 5GC.

Referring to FIG. 5, a gNB may provide functions, such as inter-cell radio resource management (inter cell RRM), RB control, connection mobility control, radio admission control, measurement configuration & provision, dynamic resource allocation. The AMF may provide functions, such as NAS security and idle state mobility processing. The UPF may provide functions, such as mobility anchoring and PDU processing. A session management function (SMF) may provide functions, such as UE IP address assignment and PDU session control.

Figure 6:
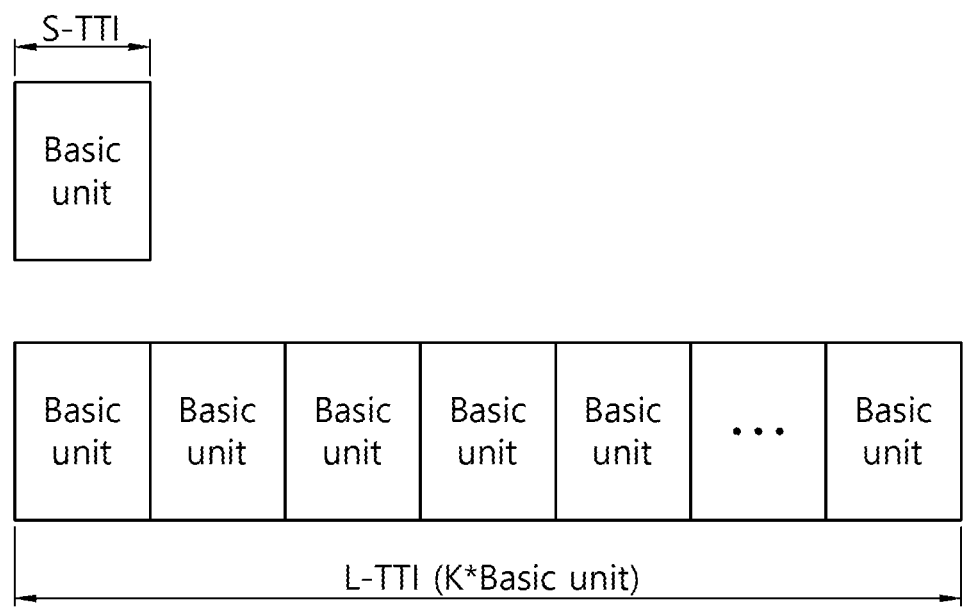
FIG. 6 schematically shows an example of an S-TTI and an L-TTI.

FIG. 6 schematically shows an example of an S-TTI and an L-TTI.

Referring to FIG. 6, if the S-TTI is defined as a previously configured (/signaled) basic resource unit, the L-TTI may be interpreted as a form in which (previously configured (/signaled)) K S-TTIs (basic resource units) have been combined.

FIG. 7 schematically shows another example of an S-TTI and an L-TTI.

Referring to FIG. 7, if the L-TTI is defined as a previously configured (/signaled) the basic resource unit, the S-TTI may be interpreted as a form in which the L-TTI (basic resource unit) has been split into (previously configured (/signaled)) K (e.g., a kind of MINI-BASIC RESOURCE UNIT).

Unlike in the example of the above figures, the S-TTI may have a form in which a plurality of (previously configured (/signaled)) basic resource units has been combined.

Figure 8:
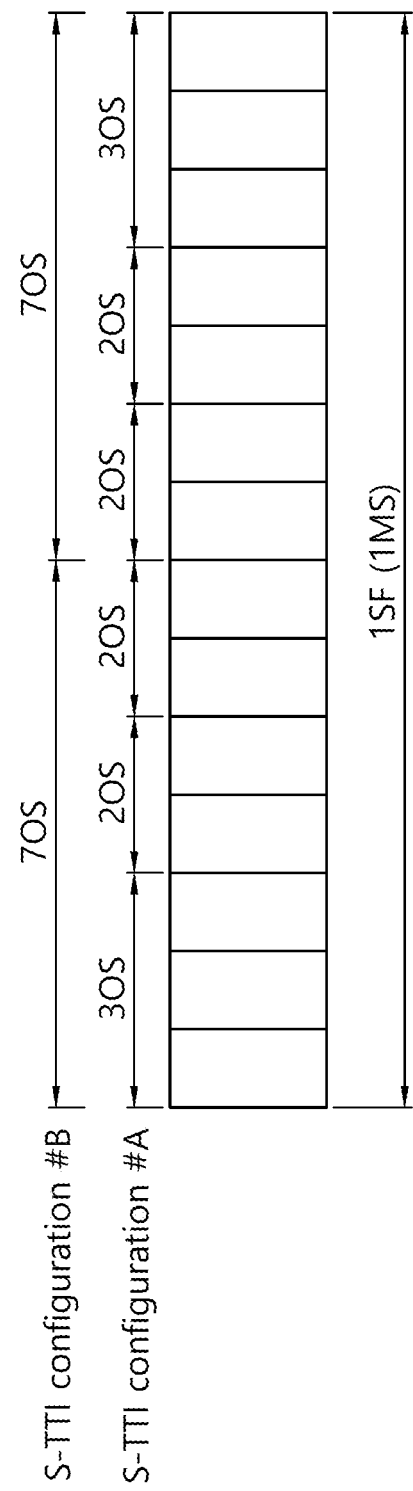
FIG. 8 schematically shows yet another example of an S-TTI and an L-TTI.

FIG. 8 schematically shows yet another example of an S-TTI and an L-TTI.

Referring to FIG. 8, for example, as in an S-TTI configuration # A, a first S-TTI may have the length of three OFDM symbols (OSs), a second S-TTI may have the length of two OFDM symbols, a third S-TTI may have the length of two OFDM symbols, a fourth S-TTI may have the length of two OFDM symbols, a fifth S-TTI may have the length of two OFDM symbols, and a sixth S-TTI may have the length of three OFDM symbols.

Alternatively, for example, as in an S-TTI configuration # B, a first S-TTI may have the length of seven OFDM symbols, and a second S-TTI may have the length of seven OFDM symbols.

Various examples of the relation between an S-TTI and an L-TTI have been illustrated so far. However, the aforementioned various examples of the S-TTIs and L-TTIs are merely examples for convenience of description, and a form of an S-TTI and an L-TTI are not limited to the disclosed forms.

Hereinafter, the Present Invention is Described.

As described above, a UE may perform S-TTI-based wireless communication. In this case, when the UE performs the S-TTI-based wireless communication, which method will be provided to derive S-TTI-based channel state information (CSI) needs to be discussed.

For example, the following proposed methods propose a method of efficiently determining (/designating) an (S-TTI) channel state information (CSI) (derivation) (e.g., DESIRED SIGNAL/INTERFERENCE MEASURMENT)-related reference resource (CSI REFERENCE RESOURCE) when relatively short TRANSMISSION TIME INTERVAL (S-TTI)-based communication (compared to the existing (e.g., "1 MS")) is performed.

Hereinafter, the abbreviations of terms to be described may be as follows.

- L-TTI: it may mean an operation based on the existing (LEGACY) 1 MS length (or the number of symbols greater than an S-TTI).
- L-TTI TX/RX: it may mean L-TTI-based channel/signal transmission/reception.
- S-TTI: it may mean an operation based on the number of symbols smaller than an L-TTI.
- S-TTI TX/RX: it may mean S-TTI-based channel/signal transmission/reception.
- S-PDCCH/PDSCH, S-PUCCH/PUSCH: it may mean S-TTI-based PDCCH/PDSCH and PUCCH/PUSCH, respectively.
- L-PDCCH/PDSCH, L-PUCCH/PUSCH: it may mean L-TTI-based PDCCH/PDSCH and PUCCH/PUSCH, respectively.

In the present invention, the followings may be taken into consideration.

- Although a UE is an S-TTI capable UE, it may have the same CSI processing (/measurement) capability as the existing (L-TTI) UE (e.g., prevent an increase of the implementation complexity of the S-TTI capable UE).
  In the present invention, an "S-TTI CAPABLE UE" may be extended and interpreted as a "SHORTENED PROCESSING UE.".
- Received interference intensity (/pattern) may be different for each S-TTI (GROUP.
  Example) In this case, it may be advantageous to perform CSI derivation (/calculation) and reporting based on S-TTI SPECIFIC DESIRED SIGNAL/INTERFERENCE MEASURMENT in terms of performance.
- In the present invention, wording "measurement" may be (limitedly) interpreted as DESIRED SIGNAL MEASURMENT (and/or INTERFERENCE MEASURMENT) (for CSI derivation/calculation).
  Example) wording "DESIRED SIGNAL" may be (limitedly) interpreted as a previously configured (/signaled) CSI-RS (or CRS or DM-RS.
  Example) wording "INTERFERENCE MEASURMENT" may be (limitedly) performed based on a previously configured (/signaled) resource (/reference signal) (e.g., IMR, CSI-RS/CRS/DM-RS).
- In the present invention, wording "CSI" may be (limitedly) interpreted as PERIODIC CSI (and/or APERIODIC CSI) (measurement/reporting).
- In the present invention, wording to denote a specific reference signal may be extended and interpreted as a different kind of reference signal (e.g., CSI-RS or CRS or DM-RS).
- In the present invention, wording "S-TTI" (or "L-TTI") may be extended and interpreted as an "L-TTI" (or "S-TTI").

Hereinafter, more detailed examples of a method for deriving S-TTI-based channel state information (CSI) are described.

(Rule # A) CSI reporting-related CSI REFERENCE RESOURCE timing at a specific (S-TTI) time point is counted in an S-TTL unit (e.g., prior to 4 S-TTIs), but if (substantial) measurement needs to be performed in an L-TTI unit, (1) the closest L-TTI prior to a time point at which the timing was counted in the S-TTI unit is considered as the (final) CSI REFERENCE RESOURCE (and/or measurement resource) or (B) an L-TTI including a time point at which the timing was counted in the S-TTI unit is considered as a CSI REFERENCE RESOURCE, wherein the (final) measurement may use only a measurement resource (or use all of measurement resources on a corresponding L-TTI) prior to the time point at which the timing was counted in the S-TTI unit on a corresponding L-TTI.

For convenience of understanding of (Rule # A), the above contents are described below with reference to the drawing.

Figure 9:
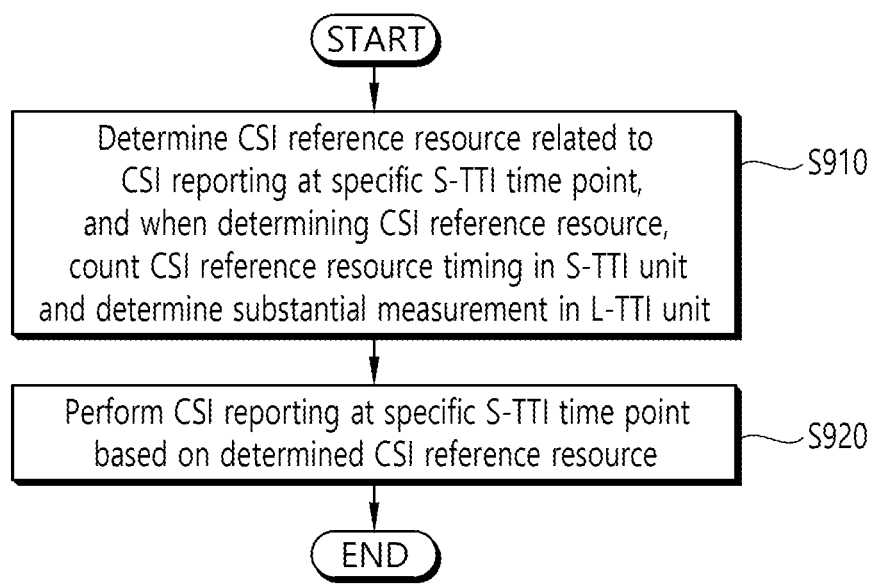
FIG. 9 is a flowchart of a method of determining a CSI reference resource according to an embodiment of the present invention.

FIG. 9 is a flowchart of a method of determining a CSI reference resource according to an embodiment of the present invention.

Referring to FIG. 9, a UE may determine a CSI reference resource related to CSI reporting at a specific S-TTI time point (S910). The UE may be a UE supporting a relatively shorter transmission time interval (S-TTI) than a legacy transmission time interval (L-TTI). Furthermore, in this case, the UE may support an L-TTI in addition to an S-TTI.

In this case, for example, when the UE determines the CSI reference resource, it may count CSI reference resource timing in an S-TTI unit and determine substantial measurement in an L-TTI unit. In this case, if measurement is performed using only (conventional) (some) reference signals (e.g., CSI-RS, CRS) within an S-TTI, a problem in that samples for CSI derivation are reduced can be solved.

A detailed example in which a UE counts CSI reference resource timing in an S-TTI unit and determines substantial measurement in an L-TTI unit is described below with reference to the drawing.

Figure 10:
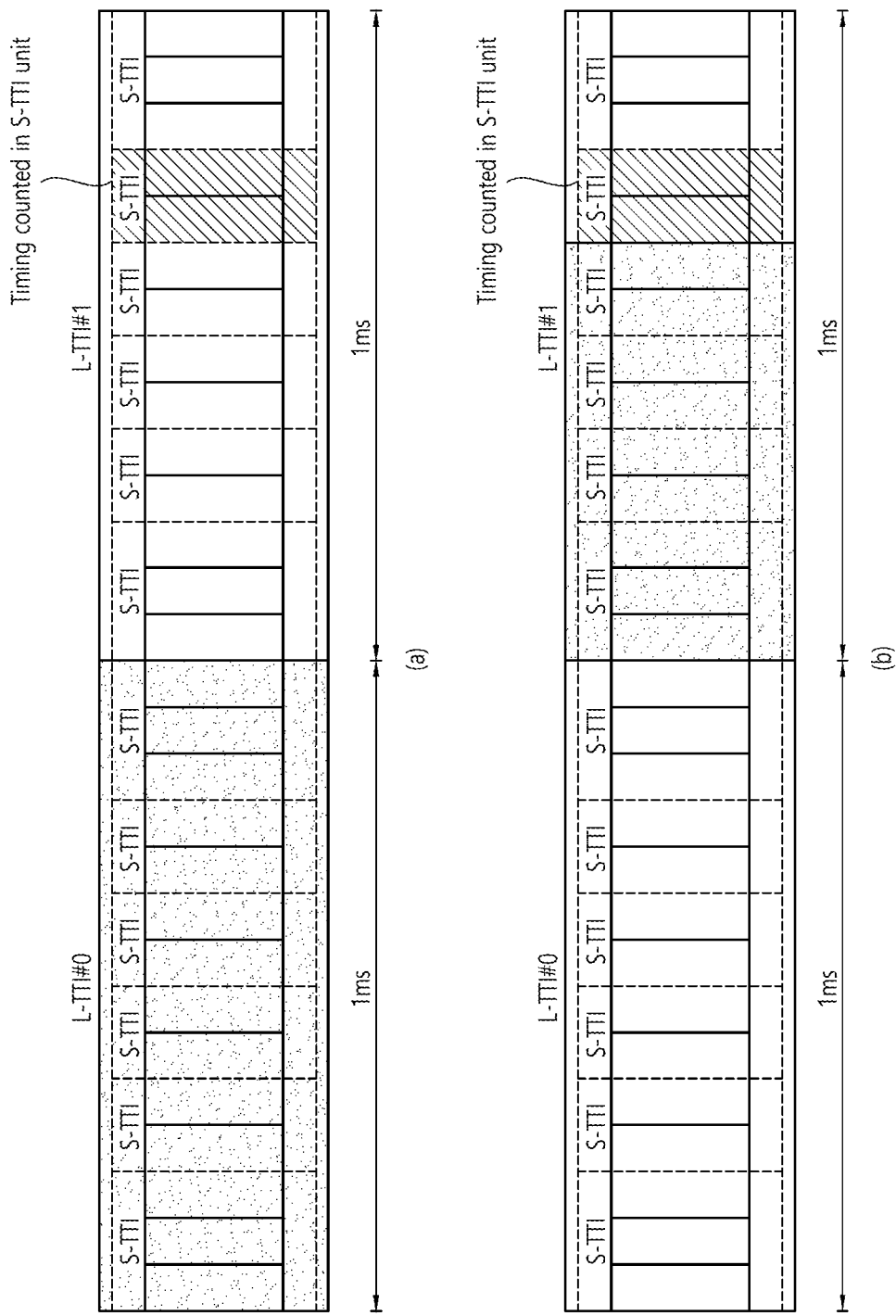
FIG. 10 schematically illustrates an example in which a UE counts CSI reference resource timing in an S-TTI unit and determines substantial measurement in an L-TTI unit.

FIG. 10 schematically illustrates an example in which a UE counts CSI reference resource timing in an S-TTI unit and determines substantial measurement in an L-TTI unit.

In this case, FIG. 10(a) corresponds to an example in which the closest L-TTI prior to a time point at which CSI reference resource timing was counted in an S-TTI unit is considered as the (final) CSI REFERENCE RESOURCE (and/or measurement resource). FIG. 10(b) corresponds to an example in which an L-TTI including a time point at which CSI reference resource timing was counted in an S-TTI unit is considered as a CSI REFERENCE RESOURCE, and the (final) measurement uses only a measurement resource (or uses all of measurement resources on the corresponding L-TTI) prior to the time point at which the CSI reference resource timing was counted in the corresponding L-TTI.

For example, as in FIG. 10(a), if a time point at which CSI reference resource timing was counted in an S-TTI unit is placed on an L-TTI #1, an L-TTI #0, that is, the closest L-TTI prior to the time point at which the CSI reference resource timing was counted in an S-TTI unit may be considered as the final CSI reference resource.

In this case, if a CSI reference resource is determined as in the example of FIG. 10(a), there is an advantage in that the number of samples for the CSI derivation of a UE can be increased.

Furthermore, for example, as in FIG. 10(b), if a time point at which CSI reference resource timing was counted in an S-TTI unit is placed on an L-TTI #1, the L-TTI #1, that is, an L-TTI including the time point at which the CSI reference resource timing was counted in an S-TTI unit is considered as the final CSI reference resource, but only a measurement resource prior to the time point at which the CSI reference resource timing was counted in an S-TTI unit on the L-TTI #1 may be used.

In this case, if a CSI reference resource is determined as in the example of FIG. 10(b), there is an advantage in that a UE can use a recent sample (compared to the case of FIG. 10(a)) when performing CSI derivation.

Referring back to FIG. 9, the UE may perform CSI reporting at a specific S-TTI time point based on the determined CSI reference resource (S920). In this case, a detailed example in which the UE performs CSI reporting at a specific S-TTI time point based on the determined CSI reference resource is described later.

Example) For another example, CSI reporting-related CSI REFERENCE RESOURCE timing at a specific (S-TTI) time point is counted in an L-TTI (or MS) unit, but if (substantial) measurement needs to be performed in an S-TTI unit (e.g., prior to 4 MS), (1) the closest S-TTI prior to the time point at which the timing was counted in an L-TTI (or MS) unit is considered as the (final) CSI REFERENCE RESOURCE (and/or measurement resource) or (B) an S-TTI including the time point at which the timing was counted in an L-TTI (or MS) unit is considered as a CSI REFERENCE RESOURCE and the (final) measurement may use only measurement resource (or use all of measurement resources on the corresponding S-TTI) prior to the time point at which the timing was counted in an L-TTI (or MS) on the corresponding S-TTI.

Example) For yet another example, CSI reporting-related CSI REFERENCE RESOURCE timing at a specific (S-TTI) time point is counted in an L-TTI (or MS) unit, but if (substantial) measurement needs to be performed in an L-TTI unit (e.g., prior to 4 MS), (1) the closest L-TTI prior to a time point at which the timing was counted in an L-TTI (or MS) unit is considered as the (final) CSI REFERENCE RESOURCE (and/or measurement resource) or (B) an L-TTI including the time point at which the timing was counted in an L-TTI (or MS) unit is considered as a CSI REFERENCE RESOURCE and the (final) measurement may use only a measurement resource (or use all of measurement resources on the corresponding L-TTI) prior to the time point at which the timing was counted in an L-TTI (or MS) unit on the corresponding L-TTI.

In the present invention, to count CSI reference resource timing in an S-TTI unit and to determine substantial measurement in an S-TTI unit when a UE determines a CSI reference resource are not excluded.

Hereinafter, an example in which a UE follows an S-TTI GRANULARITY-based CSI REFERENCE RESOURCE/ CSI REFERENCE RESOURCE DETERMINATION TIMELINE is described.

(Rule # B) if CSI reporting at a specific (S-TTI) time point (1) has been triggered on an S-TTI PDCCH (or through S-TTI DCI), or (2) has been triggered by CSI reporting triggering DCI indicative of an S-TTI (CSI) type, or (3) has been transmitted through an S-TTI PUSCH (/PUCCH), or (4) requires S-TTI-related (CSI) information (e.g., S-TTI (SET)-SPECIFIC CSI reporting operation), a CSI REFERENCE RESOURCE (and/or measurement resource and/or reporting) may be (limitedly) configured (/signaled) as an S-TTI (type).

Example) The S-TTI designated (/selected) as the CSI REFERENCE RESOURCE (and/or measurement resource) may be limited to be the same (or previously configured (/signaled) critical difference or less) as (1) an S-TTI PDCCH length in which CSI reporting has been triggered, or (2) an S-TTI length indicated on CSI reporting triggering DCI, or (3) a CSI reporting type (/format/TTI length) (previously associated S-TTI length).

Example) the CSI reporting-related CSI REFERENCE RESOURCE timing may be configured (/signaled) to be (limitedly) counted in an S-TTI unit (or L-TTI unit).

For convenience of understanding of (Rule # B), the above contents are described below with reference to the drawing.

Figure 11:
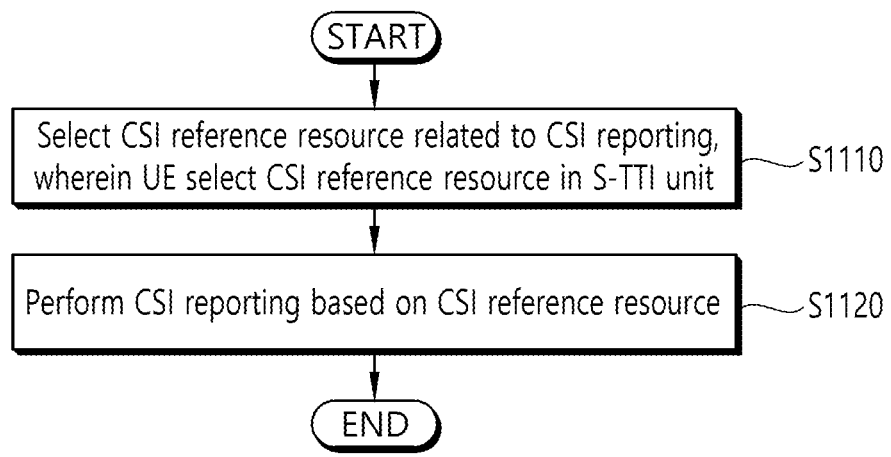
FIG. 11 is a flowchart of a method of determining a CSI reference resource according to another embodiment of the present invention.

FIG. 11 is a flowchart of a method of determining a CSI reference resource according to another embodiment of the present invention.

Referring to FIG. 11, a UE may select a CSI reference resource related to CSI reporting (S1110). The UE may be a UE supporting a relatively shorter transmission time interval (S-TTI) than a legacy transmission time interval (L-TTI). Furthermore, in this case, the UE may support an L-TTI in addition to an S-TTI.

In this case, the UE may select the CSI reference resource in the S-TTI unit. That is, the UE may follow an S-TTI GRANULARITY-based CSI REFERENCE RESOURCE/ CSI REFERENCE RESOURCE DETERMINATION TIMELINE.

For example, if the CSI reporting is triggered on an S-TTI physical downlink control channel (PDCCH), the CSI reference resource may be selected in the S-TTI unit. Alternatively, for example, if the CSI reporting has been triggered by S-TTI-related CSI reporting triggering DCI, the CSI reference resource may be selected in the S-TTI unit. Alternatively, for example, if the CSI reporting is transmitted through an S-TTI physical uplink shared channel (PUSCH) or a physical uplink control channel (PUCCH), the CSI reference resource may be selected in the S-TTI unit. Alternatively, for example, the CSI reference resource related to CSI reporting timing may be counted in an S-TTI unit.

In summary, when an S-TTI operation is performed, if CSI reporting is triggered, a CSI REFERENCE RESOURCE of an S-TTI unit is used and a CSI REFERENCE RESOURCE DETERMINATION TIMELINE (N_CQI_REF) may also be counted in an S-TTI unit. In this case, contents regarding a CSI reference resource for a serving cell may be described more specifically as follows.

In a time domain, if transmission modes 1-9 or transmission mode 10 having a single configured CSI process has been configured with respect to a serving cell regarding non—BL (bandwidth-reduced low-complexity)/coverage enhanced (CE) UE, a CSI reference resource may be defined as a single downlink slot/subslot or special slot/subslot N-N_CQI_REF. In this case, N means a slot/subslot index in which (S-TTI-based) CSI reporting is performed. In this case, the above slot/subslot may mean the aforementioned S-TTI.

In this case, if csi-SubframePatternConfig-r12, that is, a higher layer parameter, is not configured in a UE regarding aperiodic CSI reporting, for example, regarding an FDD serving cell or TDD serving cell, N_CQI_REF may follow a reference resource in the same valid downlink slot/subslot as a CSI request corresponding to an uplink DCI format or a valid slot within a special subframe.

If a UE follows an S-TTI GRANULARITY-based CSI REFERENCE RESOURCE/CSI REFERENCE

RESOURCE DETERMINATION TIMELINE, when the UE performs CSI derivation, there is an advantage in that the UE can use a recent sample in which an interference change for each S-TTI is taken into consideration.

Thereafter, the UE may perform CSI reporting at a specific time point based on the determined CSI reference resource (S1120). In this case, a detailed example in which the UE performs CSI reporting at a specific S-TTI time point based on the determined CSI reference resource is described later.

Although not separately shown, the embodiment of FIG. 11 may be combined (or separated) with (or from) the aforementioned (or to be described) embodiments.

Figure 13:
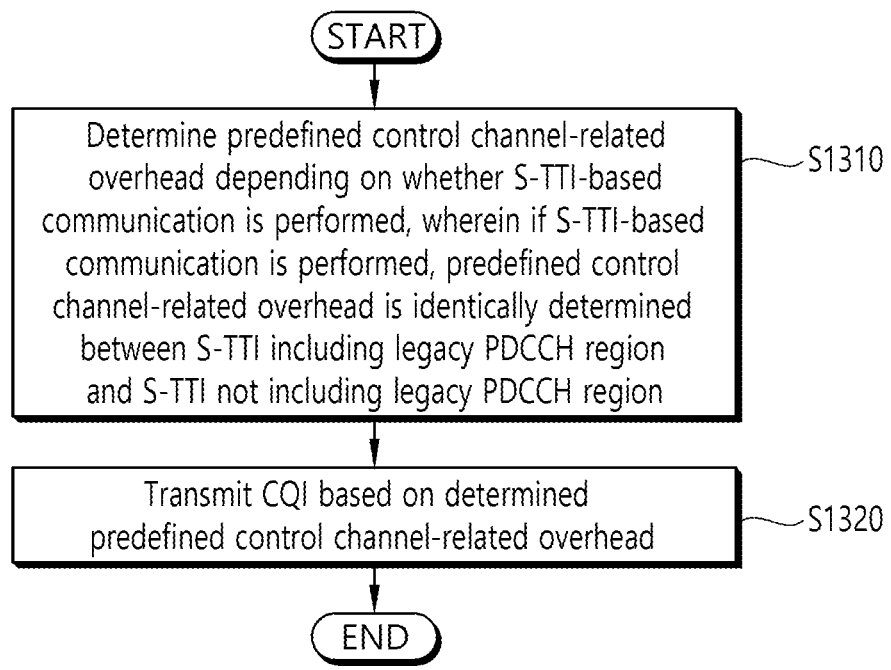
FIG. 13 is a flowchart of a method of determining overhead assumed when a CSI index is derived in an S-TTI situation according to an embodiment of the present invention.

For example, the UE according to FIG. 11 may be combined with the embodiment according to FIG. 13. For example, the UE according to FIG. 11 determines predefined control channel-related overhead depending on whether S-TTI-based communication is performed, but if the S-TTI-based communication is performed, the UE may determine the predefined control channel-related overhead to be identical between an S-TTI including a legacy PDCCH region and an S-TTI not including a legacy PDCCH region. Thereafter, the UE may transmit the CQI based on the determined predefined control channel-related overhead.

Figure 15:
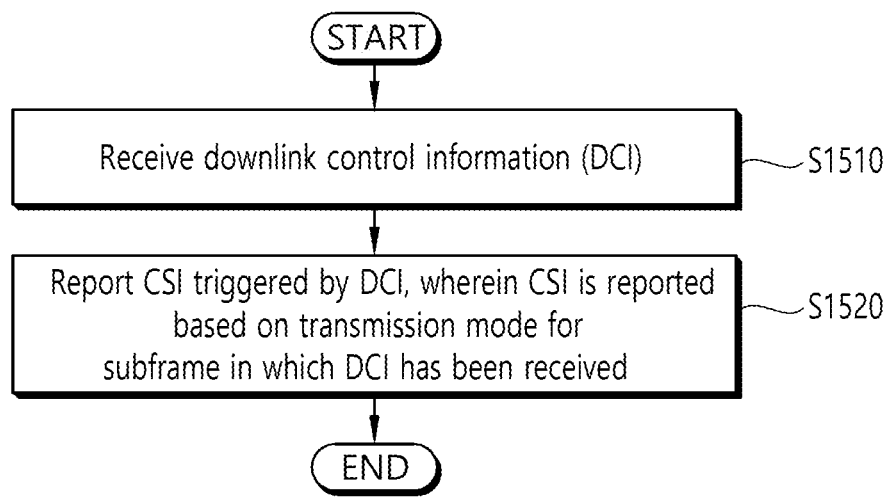
FIG. 15 is a flowchart of a method of performing CSI reporting based on a determined transmission mode according to an embodiment of the present invention.

For example, the UE according to FIG. 11 may also be combined the embodiment according to FIG. 15. For example, the UE according to FIG. 11 receives downlink control information (DCI) and reports CSI triggered by the DCI, but the CSI may be reported based on a transmission mode for a subframe in which the DCI has been received.

(Rule # C) If a CSI reporting-related CSI REFERENCE RESOURCE (and/or measurement resource) at a specific time point (S-TTI) is an S-TTI (type) (or L-TTI (type)), the (final) determination/measurement may be performed other than previously configured (/signaled) following (some) S-TTI (or resource region).

For example, according to Rule # C, a CSI reporting-related CSI REFERENCE RESOURCE can be efficiently determined/measured other than an S-TTI (or resource region) not having a meaning as a CSI REFERENCE RESOURCE as follows.

Example) S-TTI included in an L-PDCCH region (or including at a previously configured (/signaled) threshold ratio or more)

Example) L-PDCCH region

Example) Whether an S-TTI including an L-PDCCH will be excluded from a CSI REFERENCE RESOURCE (candidate) (or will be used in the (final) measurement operation) may be differently determined based on a CFI value (or depending on the number of symbols forming an S-TTI).

For example, in the case of "CFI=1/3", 6 S-TTIs forming a single L-TTI (DL) SF may include "3/2/2/2/2/3" symbols (OFDM SYMBOLS (OSs)), respectively. In this case, in the case of "CFI=1", the first S-TTI (3 OSs) is included as a CSI REFERENCE RESOURCE (candidate), whereas "CFI=3" may be configured to be excluded. Furthermore, in the case of "CFI=2", 6 S-TTIs forming a single L-TTI (DL) SF may include "2/3/2/2/2/3" symbols, respectively. In this case, the first S-TTI (2 OSs) may be configured to be (always) excluded from a CSI REFERENCE RESOURCE (candidate).

For example, if 2 S-TTIs forming a single L-TTI (DL) SF include "7/7" symbols, respectively, the first S-TTI (7 OSs) may be configured to be (always) included as a CSI REFERENCE RESOURCE (candidate).

Example) a previously configured (/signaled) reference signal (e.g., CSI-RS (or CRS or DM-RS)) or an S-TTI (or resource region (e.g., symbol)) not including an interference measurement resource (e.g., IMR) (e.g., in such a case, only the corresponding reference signal or S-TTI (or resource region) including the interference measurement resource may be considered as a CSI REFERENCE RESOURCE (candidate) (or used for the (final) measurement))

Example) an S-TTI having the number of symbols smaller than a previously configured (/signaled) threshold (or S-TTI in which a ratio occupied by an S-TTI CONTROL CHANNEL RB SETs (compared to all of resources on an S-TTI) is greater than a previously configured (/signaled) threshold)

(Rule # D) (A) An S-TTI CSI reporting (/generation/calculation)-related (minimum) processing time (e.g., a (minimum) interval between an S-TTI CSI reporting time point and a CSI REFERENCE RESOURCE time point) and (B) a (minimum) interval between an S-TTI control information (e.g., DL GRANT) reception time point and a corresponding control information/data (e.g., S-PDSCH) decoding and (data) A/N information generation/transmission time point (or a (minimum) interval between an S-TTI control information (e.g., UL GRANT) reception time point and a corresponding control information decoding and data (e.g., S-PUSCH) information generation/transmission time point) may be independently (or differently or identically) configured (/signaled) in an (S-TTI) UE by a network (or BS). In this case, for example, a corresponding rule may be limitedly applied only when previously configured (/signaled) specific TM (e.g., TM10)-based communication is performed or may be implicitly applied only when a CSI of a (CSI PROCESS) number (/bit) greater tan a previously configured (/signaled) threshold is (simultaneously) reported.

Example) the UE may report its own CAPABILITY information related to the (minimum) time interval (/processing time) to a (serving) BS through predefined signaling.

Example) The S-TTI CSI reporting (/generation/calculation)-related (minimum) processing time may be differently configured (/signaled) depending on (A) the number of OSs forming an S-TTI designated as a CSI REFERENCE RESOURCE or (B) whether (all) reference signals (PORTS) (or IMR) resources configured (/signaled) on an L-TTI are used (or whether (some) reference signals (PORTS) (or IMR) resources configured (/signaled) on an S-TTI (or designated as a CSI REFERENCE RESOURCE) are used upon S-TTI CSI derivation (/calculation).

(Rule # E) In the case of an S-TTI (or L-TTI) designated as a CSI REFERENCE RESOURCE, overhead assumed when a CSI index is derived may be configured (/signaled) (differently from an L-TTI) (by a network) according to the following (some) rules.

Example) The number of (FIRST) OSs occupied by CONTROL SIGNALING

For example, the number of corresponding OSs may be differently (or identically) configured (/signaled) according to (A) the number of symbols forming an S-TTI or (B) the type (combination) of CONTROL CHANNEL RB SETs configured on an S-TTI (e.g., CONTROL CHANNEL RB SET based on CRS/DM-RS decoding), or (C) the number of symbols occupied by CONTROL CHANNEL RB SETs (within an S-TTI).

For example, the number of corresponding OSs may be identically (or differently) configured (/signaled) between an S-TTI including an L-PDCCH and an S-TTI not including an L-PDCCH. That is, predefined control channel (e.g., L-PDCCH)-related overhead assumed when a CQI INDEX is derived may be identically (or differently) configured (/signaled) between an S-TTI including an L-PDCCH and an S-TTI not including an L-PDCCH.

For convenience of understanding of (Rule # E), the above contents are described below with reference to the drawing.

First, an example of overhead assumed when a CSI index is derived in an L-TTI situation is described with reference to the drawing.

Figure 12:
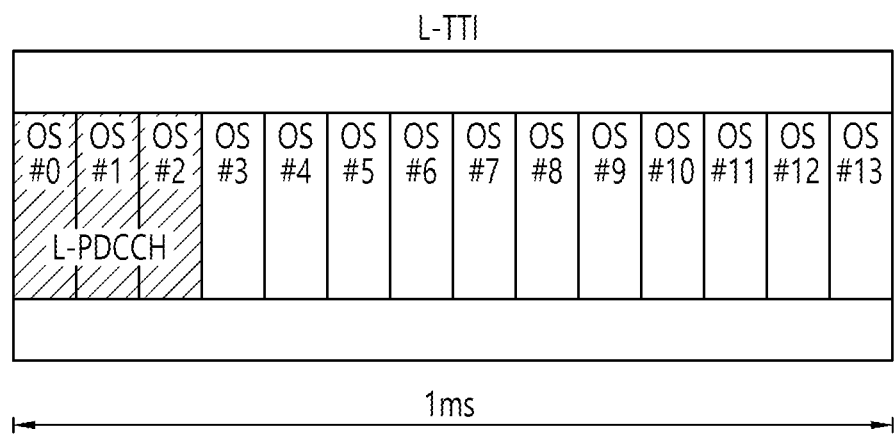
FIG. 12 schematically shows an example of a method of determining overhead assumed when a CSI index is derived in an L-TTI situation.

FIG. 12 schematically shows an example of a method of determining overhead assumed when a CSI index is derived in an L-TTI situation.

According to the example of FIG. 12, the L-TTI includes a total of 14 OSs. A UE assumes the number of OFDM symbols occupied by a legacy PDCCH (i.e., L-PDCCH) (or CONTROL SIGNALING) to be always 3 (regardless of the number of L-PDCCH OFDM symbols actually indicated by a PCFICH) when deriving a CQI index based on an L-TTI, and excludes the three OFDM symbols. That is, it is assumed that when a UE derives a CQI index based on an L-TTI, 3 OFDM symbols disposed at the front of the L-TTI are always excluded (as control signaling (or L-PDCCH) overhead). According to the example of FIG. 12, the UE assumes an OS #0, an OS #1 and an OS #2 to be control signaling (or L-PDCCH) overhead, excludes them, and derives a CQI index based on the L-TTI.

Hereinafter, a method of determining overhead assumed when a CSI index is derived in an S-TTI situation is described with reference to the drawing.

FIG. 13 is a flowchart of a method of determining overhead assumed when a CSI index is derived in an S-TTI situation according to an embodiment of the present invention.

Referring to FIG. 13, a UE may determine predefined control channel-related overhead (assumed when a CQI INDEX is derived) depending on whether S-TTI-based communication is performed (S1310). In this case, if the S-TTI-based communication is performed, the predefined control channel-related overhead may be identically determined between an S-TTI including a legacy PDCCH region and an S-TTI not including a legacy PDCCH region. The UE may be a UE supporting a relatively shorter transmission time interval (S-TTI) than a legacy transmission time interval (L-TTI). Furthermore, in this case, the UE may support an L-TTI in addition to an S-TTI.

In this case, for example, the predefined control channel may be a PDCCH. Furthermore, for example, the L-TTI may include a plurality of S-TTIs. Furthermore, for example, the L-TTI may be 1 ms.

Furthermore, for example, if the S-TTI-based communication is performed, the predefined control channel-related overhead may be identically determined between a reference resource based on an S-TTI including a legacy PDCCH region and a reference resource based on an S-TTI not including a legacy PDCCH region.

In other words, control channel (e.g., legacy PDCCH)-related overhead (previously configured) fixed with respect to all of S-TTIs may be assumed regardless of whether a specific S-TTI includes a legacy PDCCH region, and an example thereof may include the following examples.

FIG. 14 schematically shows an example in which control channel (e.g., legacy PDCCH)-related overhead (previously configured) fixed with respect to all of S-TTIs may be assumed regardless of whether a specific S-TTI includes a legacy PDCCH region is assumed.

FIG. 14(*a*) shows that a single L-TTI includes two slots (i.e., an S-TTI is a slot unit), and FIG. 14(*b*) shows that a single L-TTI includes six subslots (i.e., an S-TTI is a subslot unit).

For example, if a CSI request field on an uplink DCI format 7-0A/7-0B is set to trigger a report and a UE is configured for slot-based (S-TTI) uplink transmission, the UE assumes the number of REs available on an S-TTI reference resource to be half the number of REs available on the existing L-TTI reference resource in order to derive a CQI index based on an S-TTI. In this case, the DCI format 7-0A/7-0B is a DCI format for an S-TTI. Accordingly, what the CSI request field on the uplink DCI format 7-0A/7-0B is set to trigger a report may mean a case where CSI reporting based on an S-TTI is triggered.

In other words, if an S-TTI of a SLOT unit is configured, it may mean that ½ of PDCCH OVERHEAD ASSUMPTION on the existing 1 MS SF-based CSI REFERENCE RESOURCE is identically assumed on all of SLOT S-TTI CSI REFERENCE RESOURCEs (regardless of whether a SLOT TTI actually includes a PDCCH region).

The above contents are described through the example of FIG. 14(*a*). When a UE performs slot-based S-TTI communication, the UE assumes the same amount of (previously set) legacy PDCCH-related overhead regardless of the Slot #0 of FIG. 14(*a*) including a legacy PDCCH region or the Slot #1 of FIG. 14(*a*) not including a legacy PDCCH region, and then derives a CQI index based on an S-TTI.

For another example, if a CSI request field on an uplink DCI format 7-0A/7-0B is set to trigger a report and a UE is configured for subslot-based (S-TTI) uplink transmission, the UE assumes the number of REs available on an S-TTI reference resource to be ⅙ of the number of REs available on the existing L-TTI reference resource in order to derive a CQI index based on an S-TTI.

In other words, if an S-TTI of a SUB-SLOT unit is configured, this may mean that ⅙ of PDCCH OVERHEAD ASSUMPTION on a CSI REFERENCE RESOURCE based on the existing 1 MS SF is identically assumed on all of SUB-SLOT S-TTI CSI REFERENCE RESOURCES (regardless of whether a SUB-SLOT TTI actually includes a PDCCH region).

The above contents are described through the example of FIG. 14(*b*). When a UE performs subslot-based S-TTI communication, the UE assumes the same amount of (previously set) legacy PDCCH-related overhead regardless of the Subslot #0 of FIG. 14(*b*) including a legacy PDCCH region or the Subslot #1, Subslot #2, Subslot #3, Subslot #4 and Subslot #5 of FIG. 14(*b*) not including a legacy PDCCH region, and then derives a CQI index based on an S-TTI.

Referring back to FIG. 13, thereafter, the UE may transmit the CQI based on the determined predefined control channel-related overhead (S1320).

For example, the UE may derive a CQI index transmitted in an uplink subframe n according to a predefined rule. For example, the corresponding CQI index may mean the highest CQI index of CQI indices that satisfy a predefined condition from among CQI indices in Table 1 and Table 2. The corresponding condition may mean that (a modulation scheme and transport block size corresponding to a CQI index, the amount of resources available on a CSI reference resource, etc. are taken into consideration, but) a single PDSCH transport block is received at a transport block error probability that the single PDSCH transport block does not exceed 0.1 (10%).

Alternatively, for example, if a CQI index 1 does not satisfy the condition, the UE may transmit the CQI index 0 in an uplink subframe n.

In this case, a description of each table is as follows.

TABLE 1

| CQI index | Modulation | Code rate × 1024 | Efficiency |
|---|---|---|---|
| 0 | Out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 2

| CQI index | Modulation | Code rate × 1024 | Efficiency |
|---|---|---|---|
| 0 | Out of range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

As described above, the following effect is achieved if assumed control channel-related overhead when a CQI IDEX (based on an S-TTI) is derived is identically set between an S-TTI including an L-PDCCH and an S-TTI not including an L-PDCCH. For example, if assumed control channel-related overhead when a CQI IDEX (based on an S-TTI) is derived is differently set between an S-TTI including an L-PDCCH and an S-TTI not including an L-PDCCH, for example, the calculation of a CQI value may be complicated as a first S-TTI including a legacy PDCCH region is determined to be a low CQI value and a second S-TTI not including a legacy PDCCH region is determined to be a high CQI value. In contrast, if assumed control channel-related overhead when a CQI IDEX (based on an S-TTI) is derived is identically set between an S-TTI including an L-PDCCH and an S-TTI not including an L-PDCCH, the calculation of a CQI value can be simplified. In other words, if assumed control channel-related overhead when a CQI IDEX (based on an S-TTI) is derived is identically set between an S-TTI including an L-PDCCH and an S-TTI not including an L-PDCCH, a UE implementation can be simplified.

Although separately not shown, the embodiment of FIG. 13 may be combined (or separated) with (or from) the aforementioned (or to be described) embodiments.

For example, the UE according to FIG. 13 may be combined with the embodiment according to FIG. 11. For example, the UE according to FIG. 13 selects the CSI reference resource based on CSI reporting, but the UE may select the CSI reference resource in the S-TTI unit and perform the CSI reporting based on the CSI reference resource.

For example, the UE according to FIG. 13 may also be combined with the embodiment according to FIG. 15. For example, the UE according to FIG. 13 receives downlink control information (DCI) and reports CSI triggered by the DCI, but the CSI may be reported based on a transmission mode for a subframe in which the DCI has been received.

For example, the number of corresponding OSs may be considered (/signaled) identically with the number of symbols occupied by a CONTROL CHANNEL RB SET within an S-TTI.

For example, the number of corresponding OSs may be considered (/signaled) as a maximum value (or minimum value) from among the number of symbols occupied by a CONTROL CHANNEL RB SET configured on an S-TTI (excluding an S-TTI including an L-PDCCH) forming a single L-TTI (DL) SF, for simplicity.

Example) In the case of an S-TTI (not including an L-PDCCH), only a (time/frequency) resource region occupied by a CONTROL CHANNEL RB SET may be designated as overhead (taken into consideration when a CQI INDEX is derived).

For example, in the case of an S-TTI including an L-PDCCH, the same number of (CONTROL SIGNALING) (FIRST) OSs as that of the existing (LEGACY) L-TTI (or the number of additionally configured (/signaled) OSs for a UE performing S-TTI-based communication) may be designated as overhead.

Example) previously configured (/signaled) type (/size)o| (A) reference signal (e.g., CRS, CSI-RS, DM-RS), or (B) interference measurement resource (e.g., IMR)0| may be designated as overhead.

For example, whether reference signal (or interference measurement resource) overhead is taken into consideration (or amount) may be differently (or identically) configured (/signaled) depending on (A) the number of symbols forming an S-TTI, or (B) an S-TTI including (or not including) an L-PDCCH, or (C) the type (combination) of CONTROL CHANNEL RB SETs configured on an S-TTI, or (D) the number of symbols occupied by CONTROL CHANNEL RB SETs (within an S-TTI).

For example, since a reference signal (or interference measurement resource) may not be present in all of S-TTIs, reference signal (or interference measurement resource) overhead may be defined (so that only a reference signal (or interference measurement resource) PORTION included on a (corresponding) S-TTI or a reference signal (/interference measurement resource) of the number of previously configured (/signaled) PORTS (or RANKS) (for corresponding use) is (limitedly) taken into consideration (or defined so that the reference signal overhead is taken into consideration regardless of whether the reference signal overhead on an S-TTI is present (/transmitted)) only when the reference signal overhead is actually present (/transmitted) on an S-TTI.

Example) reference signal overhead (e.g., CRS) on a random S-TTI may be assumed to be a maximum value (or minimum value or previously configured (/signaled) specific value (corresponding to the number of PORTS)) from among reference signal overhead (PORTION) (included) for each S-TTI forming an L-TTI to which the corresponding S-TTI belongs.

For example, if CSI-RS overhead is to be taken into consideration, only a resource (e.g., RE) associated with (some number of) CSI-RS PORT(S) (e.g., for S-TTI channel measurement use) configured (/signaled) for an S-TTI (from among (all) CSI-RS PORT(S) configured (/signaled) on L-TTI) (and/or a resource associated with (all) CSI-RS PORT(S) on L-TTI) may be assumed (or a CSI-RS resource of the number of PORTs previously configured (/signaled) for the corresponding use may be assumed). In this case, for example, if a CSI REFERENCE RESOURCE(S) related to (simultaneously (or together) triggered) L-TTI CSI reporting and S-TTI CSI reporting overlap (partially or fully) (e.g., the reporting time points of an L-TTI CSI/S-TTI CSI may not overlap) or if L-TTI CSI reporting and S-TTI CSI reporting have been (together) configured, (exceptionally) S-TTI-related CSI-RS overhead may assume only a resource associated with (some number of) CSI-RS PORT(S) configured (/signaled) for an S-TTI (and/or may assume a resource associated with (all) CSI-RS PORT(S) on an L-TTI) (e.g., a CSI-RS resource (/overhead) overlapped between the L-TTI and the S-TTI may not be redundantly counted) (or a CSI-RS resource of the number of previously configured (/signaled) PORTs for the corresponding use may be assumed).

For example, if DM-RS overhead is to be taken into consideration, a DM-RS resource (e.g., RE) of the same number of PORTs as the RANK most recently reported as an S-TTI CSI (and/or L-TTI CSI) (or a DM-RS resource of the number of previously configured (/signaled) PORTs (or RANK) for the corresponding use may be assumed (e.g., a corresponding rule may be limitedly only when the number of CSI-RS PORTs configured (/signaled) for an S-TTI is 2 or more). In this case, for example, if CSI REFERENCE RESOURCE(S) related to (simultaneously (or together) triggered) L-TTI CSI reporting and S-TTI CSI reporting overlap (partially or fully) (e.g., the reporting time points of an L-TTI CSI/S-TTI CSI may not overlap) or if L-TTI CSI reporting and S-TTI CSI reporting have been (together) configured, (exceptionally) S-TTI-related DM-RS overhead may assume a DM-RS resource of the same number of PORTs as RANKs most recently reported as an S-TTI CSI (and/or L-TTI CSI) (e.g., a DM-RS resource (/overhead) overlapped between an L-TTI and an S-TTI may not be redundantly counted) (or may assume a DM-RS resource of the number of previously configured (/signaled) PORTs (or RANKs) for the corresponding use).

For example, a network (or BS) may operate L-TTI/S-TTI CSI reporting triggering (/operation) so that a CSI REFERENCE RESOURCE(S) related to L-TTI CSI reporting and S-TTI CSI reporting do not overlap (partially or fully) (e.g., the reporting time points of an L-TTI CSI/S-TTI CSI may not overlap) (i.e., if such a rule is applied, a UE does not expect that a CSI REFERENCE RESOURCE(S) related to L-TTI CSI reporting and S-TTI CSI reporting overlap (partially or fully)).

(Rule # O) If a CSI REFERENCE RESOURCE (related to an (aperiodic) (S-TTI) CSI reporting through an S-TTI channel (e.g., S-PUSCH) is configured in an L-TTI unit (e.g., 1 MS), CQI INDEX derivation-related DM-RS overhead (A) may be assumed to be the sum of DM-RS overhead for each S-TTI forming a corresponding (L-TTI) CSI REFERENCE RESOURCE, or (B) may be assumed to be only the sum of DM-RS overhead of a predefined S-TTI number (/location), or (C) may be assumed to be L-TTI (CSI reporting-related)-related DM-RS overhead. In this case, for example, the DM-RS overhead (or L-TTI DM-RS overhead) for each S-TTI (A) may be assumed to be a DM-RS resource (e.g., RE) of the same number of PORTs as RANKS most recently reported as an S-TTI CSI (or L-TTI CSI) or may be assumed to be a DM-RS resource of the number of (S-TTI or L-TTI) PORTS (or RANKS) previously configured (/signaled) for the corresponding use.

Furthermore, for example, the following proposed methods propose an efficient (aperiodic) (S-TTI) CSI reporting/triggering method if an S-TTI-related TM is independently (or differently) configured (/signaled) in a UE for which S-TTI-based communication (in addition to L-TTI) has been (simultaneously) configured (/signaled), for each predefined SF TYPE (or SF SET). In this case, for example, a corresponding SF TYPE (or SF SET) may be divided into an "MBSFN SF TYPE (MBSFN_SF)" and a "NON-MBSFN SF TYPE (NMBSFN_SF)." For detailed example, (A) a TM (e.g., TM 4) in which CRS-based decoding is performed by taking into consideration (relatively) high DM-RS overhead (compared to a resource (e.g., RE) available for data transmission) may be configured (/signaled) on NMBSFN_SF. In contrast, (B) a TM (e.g., TM 9/10) in which DM-RS-based decoding is performed by taking into consideration that there is no CRS transmission (in a LEGACY PDSCH region) (e.g., DM-RS overhead to a resource available for data transmission becomes relatively low) may be configured (/signaled) on MBSFN_SF. In this case, for example, the L-TTI-related TM may be configured (/signaled) independently (or differently) from that of an S-TTI.

(Rule # K) An indicator (field) regarding that which (S-TTI) TM (or SF TYPE)-related reporting is triggered may be defined on an (aperiodic) (S-TTI) CSI triggering DCI (e.g., S-PDCCH). In this case, for example, the corresponding indicator (field) may be defined as "1 bit" (e.g., if the corresponding indicator is "1", it may mean MBSFN_SF (TM)-related (S-TTI) CSI reporting triggering. If the corresponding indicator is "0", it may mean NMBSFN_SF (TM)-related (S-TTI) CSI reporting).

(Rule # L) A UE may be enabled to implicitly check which (S-TTI) TM (or SF TYPE)-related reporting has been triggered depending on that an S-TTI in which (aperiodic) (S-TTI) CSI triggering DCI (e.g., S-PDCCH) is received belongs to which SF TYPE (or depending on that (aperiodic) (S-TTI) CSI reporting is performed through an S-TTI channel (e.g., S-PUSCH/PUCCH) belonging to which SF TYPE). In this case, for example, if corresponding (S-TTI) CSI triggering DCI is received in an S-TTI on MBSFN_SF (or if (S-TTI) CSI reporting is performed through an S-TTI channel on MBSFN_SF), what MBSFN_SF (TM)-related (S-TTI) CSI reporting has been triggered may be assumed (/interpreted). In contrast, if corresponding (S-TTI) CSI triggering DCI is received in an S-TTI on NMBSFN_SF (or if (S-TTI) CSI reporting is performed through an S-TTI channel on NMBSFN_SF), what NMBSFN_SF (TM)-related (S-TTI) CSI reporting has been triggered may be assumed (/interpreted).

For convenience of understanding, the example of (Rule # L) is described more specifically.

Conventionally, data communication and CSI reporting based on a COMMON TM have been configured regardless of an MBSFN_SF or a NON-MBSFN_SF.

Accordingly, conventionally, a TM (e.g., TM 9/10) in which DM-RS-based decoding is performed could have been configured (/signaled) for communication on an MBSFN subframe if a subframe is not an MBSFN subframe.

In the case of an S-TTI, a problem in that OVERHEAD importance occupied by a DM-RS is increased because the number of symbols forming a TTI is reduced.

In order to solve such a problem, if S-TTI-based communication is configured, a different TM configuration between an MBSFN SF and a NON-MBSFN SF was permitted. Hereinafter, in order to clarify whether "S-TTI-related aperiodic CSI reporting triggering" has which TM as a target between an BS and a UE under a corresponding situation, a method of defining that TM-related (S-TTI) CSI information associated with a corresponding SF type is reported depending on that an S-TTI in which "S-TTI-related aperiodic CSI reporting triggering DCI" is received belongs to which SF type (e.g., MBSFN SF, NON-MBSFN SF) is provided.

FIG. 15 is a flowchart of a method of performing CSI reporting based on a determined transmission mode according to an embodiment of the present invention.

Referring to FIG. 15, a UE may receive downlink control information (DCI) (S1510). The UE may be a UE supporting a relatively shorter transmission time interval (S-TTI) than a legacy transmission time interval (L-TTI). Furthermore, in this case, the UE may support an L-TTI in addition to an S-TTI.

In this case, the DCI received by the UE may be (aperiodic) (S-TTI) CSI reporting triggering DCI (e.g., S-PDCCH).

Thereafter, the UE may report CSI triggered by the DCI (S1520). In this case, the CSI may be reported based on a transmission mode for a subframe in which the DCI has been received.

In this case, for example, the CSI may be reported based on a transmission mode for a subframe to which an S-TTI in which the DCI has been received belongs. Alternatively, for example, the type of subframe may be any one of a multicast broadcast single frequency network (MBSFN) subframe type and a non-MBSFN (NMBSFN) subframe type. Alternatively, for example, if the type of subframe is an MBSFN subframe type and the type of subframe is an NMBSFN subframe type, different transmission modes may be configured.

More specifically, if the CSI request field on the uplink DCI format 7-0A/7-0B is set to trigger a report, reported CSI may follow a transmission mode configured by a higher layer with respect to a subframe in which the corresponding DCI format has been received. In other words, the reported CSI may follow a transmission mode of a subframe type to which an S-TTI in which CSI reporting triggering DCI is received belongs. In this case, the DCI format 7-0A/7-0B is a DCI format for an S-TTI. Accordingly, what the CSI request field on the uplink DCI format 7-0A/7-0B is set to trigger a report may mean a case where CSI reporting based on an S-TTI has been triggered.

In this case, an example of the correlation between CSI reporting and a transmission mode is described below with reference to the drawing.

Figure 16:
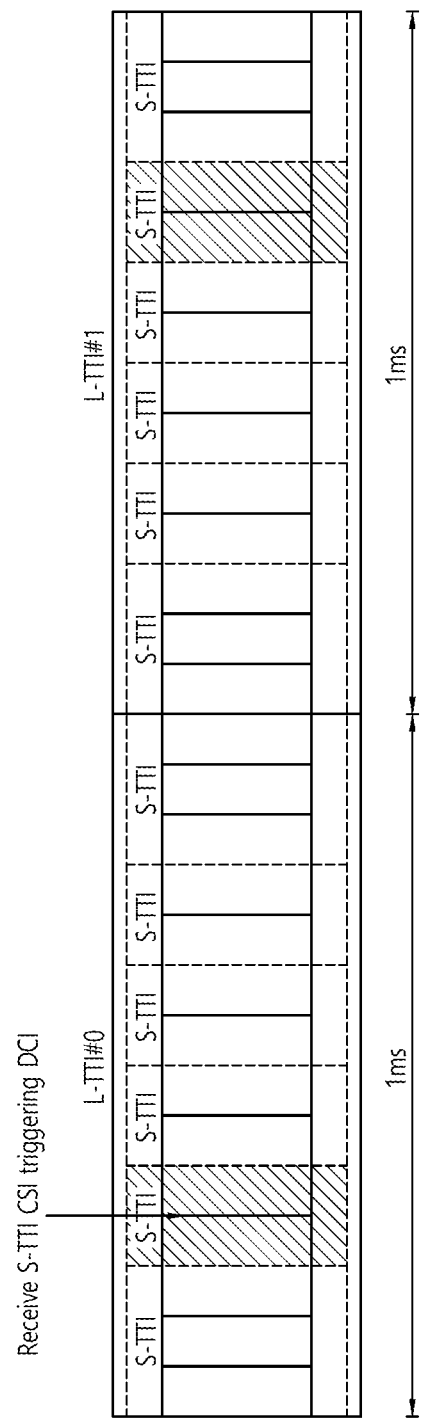
FIG. 16 schematically shows an example of the correlation between CSI reporting and a transmission mode.

FIG. 16 schematically shows an example of the correlation between CSI reporting and a transmission mode.

Referring to FIG. 16, a UE may receive S-TTI CSI reporting triggering DCI in a specific S-TTI on an L-TTI #0. In this case, CSI reporting transmitted by the UE may follow a transmission mode configured with respect to the L-TTI #0.

That is, the subframe type of the L-TTI #0 is an MBSFN subframe type, CSI reporting may follow a transmission mode according to the MBSFN subframe type. For example, if the subframe type of the L-TTI #0 is an MBSFN, CSI reporting may follow TM9 or TM10.

Alternatively, if the subframe type of the L-TTI #0 is not an MBSFN subframe type (i.e., if it is an NMBSFN subframe type), CSI reporting may follow a transmission mode according to the NMBSFN subframe type. For example, if the subframe type of the L-TTI #0 is an NMBSFN, CSI reporting may follow TM4.

Examples of the transmission mode may be the same as Table 3.

TABLE 3

| Transmission mode | DCI format | Search space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 and 7-1A | UE specific by C-RNTI | Single-antenna port, port 0 |
| (Mode 2) | DCI format 1A | Common and UE specific by C-RNTI | Transmit diversity |
|  | DCI format 1 and 7-1A | UE specific by C-RNTI | Transmit diversity |
| Mode 3 | DCI format 1A | Common and UE specific by C-RNTI | Transmit diversity |
|  | DCI format 2A and 7-1B | UE specific by C-RNTI | Large delay CDD or Transmit diversity |
| Mode 4 | DCI format 1A | Common and UE specific by C-RNTI | Transmit diversity |
|  | DCI format 2 and 7-1C | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |

TABLE 3-continued

| Transmission mode | DCI format | Search space | Transmission scheme of PDSCH corresponding to PDCCH |
|---|---|---|---|
| Mode 6 | DCI format 1A | Common and UE specific by C-RNTI | Transmit diversity |
| | DCI format 1B and 7-1D | UE specific by C-RNTI | Closed-loop spatial multiplexing using a single transmission layer |
| Mode 7 | DCI format 1A | Common and UE specific by C-RNTI | If the number of PBCH antenna ports is one, single-antenna port, port 0 is used, otherwise Transmit diversity |
| | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
| | DCI format 2B and 7-1E | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity MBSFN subframe: Single-antenna port, port 7) |
| | DCI format 2C and 7-1F | UE specific by C-RNTI | Transmit diversity, port 7-8, or dual layer transmission port 7-8, if UE is configured with higher layer parameter semiOpenLoop, up to 8 layer transmission for subframe-based PDSCH, and up to 4 layer transmission for slot/subslot-based transmissions, ports 7-14 otherwise; or single-antenna port, port 7, 8, 11, or 13 if UE is configured with higher layer parameter dmrs-tableAlt, single-antenna port, port 7 or 8 otherwise) |
| Mode 10 | DCI format 1A | Common and UE specific by C-RNTI | Non-MBSFN subframe: If the number of PBCH antenna ports is one, Single-antenna port, port 0 is used, otherwise Transmit diversity) MBSFN subframe: Single-antenna port, port 7 |
| | DCI format 2D and 7-1G | UE specific by C-RNTI | Transmit diversity, port 7-8, or dual layer transmission port 7-8, if UE is configured with higher layer parameter semiOpenLoop, up to 8 layer transmission for subframe-based PDSCH, and up to 4 layer transmission for slot/subslot-based transmissions, ports 7-14 otherwise; or single-antenna port, port 7, 8, 11, or 13 if UE is configured with higher layer parameter dmrs-tableAlt, single-antenna port, port 7 or 8 otherwise) |

Although separately not shown, the embodiment of FIG. 15 may be combined (or separated) with (or from) the aforementioned (or to be described) embodiments. For example, the UE according to FIG. 15 may be combined with the embodiment according to FIG. 11. For example, the UE according to FIG. 15 selects a CSI reference resource related to CSI reporting, but the UE may select the CSI reference resource in the S-TTI unit and perform the CSI reporting based on the CSI reference resource.

For example, the UE according to FIG. 15 may also be combined with the embodiment according to FIG. 13. For example, the UE according to FIG. 15 determines predefined control channel-related overhead depending on whether S-TTI-based communication is performed. If the S-TTI-based communication is performed, the predefined control channel-related overhead may be identically determined between an S-TTI including a legacy PDCCH region and an S-TTI not including a legacy PDCCH region, and a CQI may be transmitted based on the determined predefined control channel-related overhead.

(Rule # M) If a representative TM related to (aperiodic) (S-TTI) CSI reporting from among TMs (and/or L-TTI-related TMs) for each SF TYPE (or SF SET) is previously configured (/signaled) and (aperiodic) (S-TTI) CSI triggering DCI (e.g., S-PDCCH) is received, a UE may be enabled to (always) perform CSI information reporting for the corresponding representative TM. In this case, for example, the representative TM may be configured (/signaled) as MBSFN_SF TM (or NMBSFN_SF TM or L-TTI-related TM). Furthermore, for example, in the aforementioned (some) rule (e.g., rule # K/L/M), "CSI REFERENCE RESOURCE DETERMINATION TIMELINE" related to (aperiodic) (S-TTI) CSI reporting may be determined (differently or independently) depending on that corresponding CSI information is related to which TM.

(Rule # N) An B S receives a report on CAPABILITY information regarding that how many (S-TTI and/or L-TTI) (DL and/or UL) TMs can be supported simultaneously from a UE, and then may enable the UE to finally determine whether a TM related to a different (DL and/or UL) S-TTI has been configured for each SF TYPE (or SF SET) (and/or whether a different TM has been configured between an S-TTI/L-TTI and/or whether a TM related to an S-TTI of a specific SF TYPE (or SF SET) and a TM related to an L-TTI of a specific SF TYPE (or SF SET) are identical) based on the CAPABILITY information. In this case, for example, if the UE has reported that it can support 2 DL TMs at the same, the BS may identically configure (/signal) DL TMs related to an S-TTI of MBSFN_SF/NMBSFN_SF and may differently configure (/signal) DL TMs related to an L-TTI (or may identically configure (/signal) a TM related to an S-TTI and DL TM related to an L-TTI of NMBSFN_SF (or MBSFN_SF) and may differently configure (/signal) DM TMs related to an S-TTI of MBSFN_SF (or NMBSFN_SF). For another example, if the UE has reported that it can support 3 DL TMs at the same time, the BS may differently configure (/signal) DL TMs related to an S-TTI of MBSFN_SF/NMBSFN_SF and may also differently configure (/signal) DL TMs related to an L-TTI (TM related to an S-TTI).

Furthermore, for example, the following proposed methods propose a method of efficiently configuring/operating an EMIMO (e.g., 3D-MIMO, FD-MIMO) operation with respect to a UE (S-UE) for which S-TTI-based communication (in addition to L-TTI) has been (simultaneously) configured (/signaled).

(Rule # P) A BS may independently (or differently) configure (/signal) an EMIMO operation between an S-TTI (communication) and an L-TTI (communication) with respect to an S-UE.

(Rule # Q) For example, in an S-TTI, the amount of resources (related to a control channel) in a time axis is relatively reduced compare to an L-TTI. Accordingly, if the payload of an S-PDCCH is small (even without increasing the amount of resources used in a frequency axis), reliability can be efficiently guaranteed. Accordingly, if EMIMO has been configured (/signaled) for an S-TTI (communication), an "ACTIVATED APERIODIC CSI-RS RESOURCE number" may be limited to a previously configured (/signaled) (maximum) value (L_VAL) in order to prevent an "(aperiodic) CSI REQUEST field size" on the S-PDCCH from being (excessively) extended (e.g., cause to reduce S-PDCCH reception performance). In this case, for example, the L_VAL value may be limited to "1" in order to maintain the "(aperiodic) CSI REQUEST field size" on the S-PDCCH to "3 bits."

It is evident that examples of the aforementioned proposed method may be considered as a kind of proposed methods because they may be included as implementation methods of the present invention. Furthermore, the aforementioned proposed methods may be independently implemented, but some proposed methods may be implemented in a combination (or merge) form. For example, in the present invention, the proposed methods have been described based on the 3GPP LTE system, for convenience of description, but the scope of a system to which the proposed method is applied may be extended to systems other than the 3GPP LTE system. For example, the proposed methods of the present invention may be implicitly applied only if an S-TTI-based communication operation has been configured (/signaled). For example, the proposed methods of the present invention may be implicitly applied in the case of a previously configured (/signaled) TM (e.g., TM9 (or TM10)) (and/or if PMI/RI reporting is configured and/or in the case of aperiodic CSI reporting). The proposed methods of the present invention may be implicitly applied if an S-TTI of a specific number of OSs (e.g., 2/3 OS or 7 OSs) have been configured (/signaled). For example, the proposed methods of the present invention may be implicitly applied to only an APERIODIC CSI reporting (or PERIODIC CSI reporting) operation. The proposed methods of the present invention may be implicitly applied to only (S-TTI (or L-TTI)) on a NON-MBSFN SF (or MBSFN SF). The proposed methods of the present invention may be implicitly applied only if a single CSI PROCESS (or a plurality of CSI PROCESSES) (based on TM 10) has been configured (/signaled).

Figure 17:
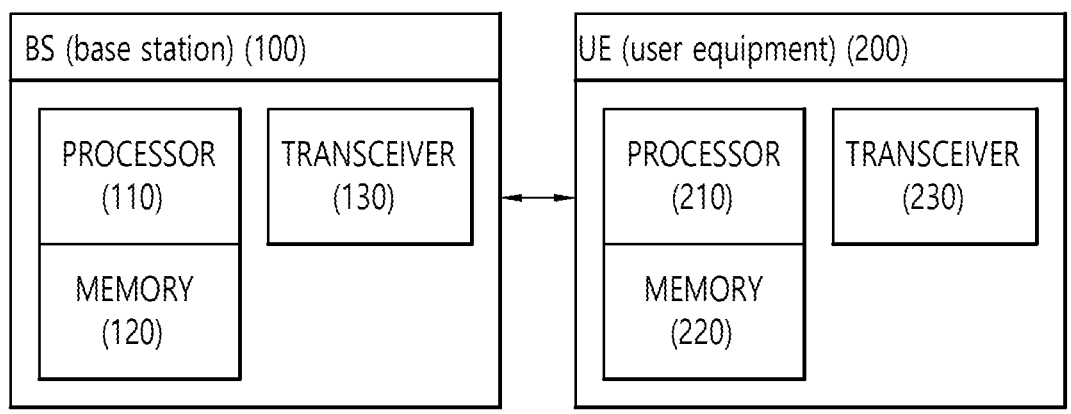
FIG. 17 is a block diagram showing a communication device in which the embodiment of the present invention is implemented.

FIG. 17 is a block diagram showing a communication device in which the embodiment of the present invention is implemented.

Referring to FIG. 17, a base station (BS) 100 includes a processor 110, a memory 120 and a transceiver 130. The processor 110 implements the proposed functions, processes and/or methods. The memory 120 is connected to the processor 110, and stores a variety of types of information for driving the processor 110. The transceiver 130 is connected to the processor 110, and transmits and/or receives radio signals.

The UE 200 includes a processor 210, a memory 220 and the RF unit 230. The processor 210 implements the proposed functions, processes and/or methods. The memory 220 is connected to the processor 210, and stores a variety of types of information for driving the processor 210. The transceiver 230 is connected to the processor 210, and transmits and/or receives radio signals. The UE 200 may perform a D2D operation on another UE according to the aforementioned method.

The processor 110,210 may include an application-specific integrated circuit (ASIC), other chipsets, logic circuits, data processing devices and/or a converter for converting a baseband signal into a radio signal, and vice versa. The memory 120,220 may include read-only memory (ROM), random access memory (RAM), flash memory, a memory card, a storage medium and/or other storage devices. The transceiver 130,230 may include one or more antennas for transmitting and/or receiving a radio signal. If the embodiment is implemented in software, the aforementioned scheme may be implemented using a module, process and function of performing the aforementioned function. The module may be stored in the memory 120,220 and executed by the processor 110,210. The memory 120,220 may be positioned inside or outside the processor 110,210 and connected to the processor 110,210 by various well-known means.

Figure 18:
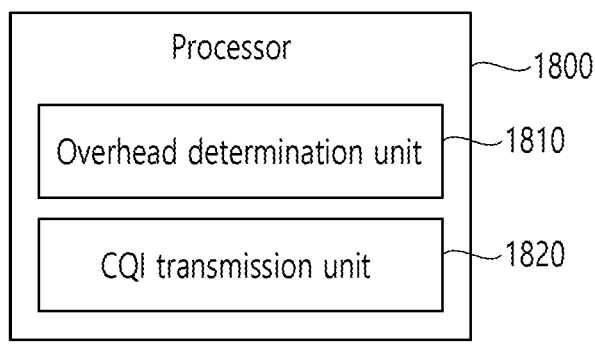
FIG. 18 is a block diagram showing an example of a device included in a processor.

FIG. 18 is a block diagram showing an example of a device included in a processor.

Referring to FIG. 17, the processor may include an overhead determination unit 1810 and a CQI transmission unit 1820 in a functional aspect. In this case, the processor may be the processor 210 of FIG. 18.

In this case, the overhead determination unit 1810 may have a function for determining predefined control channel-related overhead depending on whether S-TTI-based communication is performed. Furthermore, in this case, the CQI determination unit 1820 may have a function for transmitting a CQI based on the determined predefined control channel-related overhead.

The description of the devices included in the processor is only an example, and the processor may further include other functional elements to devices. Furthermore, a detailed example of an operation performed by each described functional device has been described above, and a redundant description thereof is omitted.

What is claimed is:

1. A method of reporting channel state information (CSI) in a wireless communication system, the method performed by a user equipment (UE), the method comprising:
receiving, in a specific subframe among a plurality of subframes, downlink control information (DCI) related to an short transmission timer interval (S-TTI); and
reporting the CSI based on the DCI set to trigger a report for the CSI,
wherein the CSI is reported based on a transmission mode for the specific subframe in which the DCI is received.

2. The method of claim 1, wherein the UE supports both the S-TTI and a legacy transmission time interval (L-TTI).

3. The method of claim 2, wherein the L-TTI is 1 ms, and the S-TTI is shorter than the L-TTI.

4. The method of claim 1, wherein a type of the specific subframe in which the DCI is received is one of a multicast broadcast single frequency network (MBSFN) subframe type or (a non-MBSFN (NMBSFN) subframe type.

5. The method of claim 4, wherein based on the type of the specific subframe in which the DCI is received being the MBSFN subframe type, the transmission mode is a first transmission mode, and
based on the type of the specific subframe in which the DCI is received being the NMBSFN subframe type, the transmission mode is a second transmission mode different from the first transmission mode.

6. A user equipment (UE) configured to operate in a wireless communication systems, the UE comprising:
a transceiver
at least one processor; and
at least one computer memory operably connectable to the at least one processor and storing instructions that, when executed by the at least one processor, perform operations comprising:
controlling the transceiver to receive, in a specific subframe among a plurality of subframes, downlink control information (DCI) related to an short transmission timer interval (S-TTI); and
controlling the transceiver to report channel state information (CSI) based on the DCI set to trigger a report for the CSI,
wherein the CSI is reported based on a transmission mode for the specific subframe in which the DCI is received.

7. The UE of claim 6, wherein the UE supports both the S-TTI and a legacy transmission time interval (L-TTI).

8. The UE of claim 7, wherein the L-TTI is 1 ms, and the S-TTI is shorter than the L-TTI.

9. The UE of claim 6, wherein a type of the specific subframe in which the DCI is received is one of a multicast broadcast single frequency network (MBSFN) subframe type or (a non-MBSFN (NMBSFN) subframe type.

10. The UE of claim 9, wherein based on the type of the specific subframe in which the DCI is received being the MBSFN subframe type, the transmission mode is a first transmission mode, and
based on the type of the specific subframe in which the DCI is received being the NMBSFN subframe type, the transmission mode is a second transmission mode different from the first transmission mode.

11. An apparatus configured to control a user equipment (UE) to operate in a wireless communication system, the apparatus comprising:
at least one processor; and
at least one computer memory operably connectable to the at least one processor and storing instructions that, when executed by the at least one processor, perform operations comprising:
receiving, in a specific subframe among a plurality of subframes, downlink control information (DCI) related to an short transmission timer interval (S-TTI); and
reporting channel state information (CSI) based on the DCI set to trigger a report for the CSI,
wherein the CSI is reported based on a transmission mode for the specific subframe in which the DCI is received.

12. The apparatus of claim 11, wherein the UE supports both the S-TTI and a legacy transmission time interval (L-TTI).

13. The apparatus of claim 12, wherein the L-TTI is 1 ms, and the S-TTI is shorter than the L-TTI.

14. The apparatus of claim 11, wherein a type of the specific subframe in which the DCI is received is one of a multicast broadcast single frequency network (MBSFN) subframe type or (a non-MBSFN (NMBSFN) subframe type.

15. The apparatus of claim 14, wherein based on the type of the specific subframe in which the DCI is received being the MBSFN subframe type, the transmission mode is a first transmission mode, and
based on the type of the specific subframe in which the DCI is received being the NMBSFN subframe type, the transmission mode is a second transmission mode different from the first transmission mode.

* * * * *